No. 656,717. Patented Aug. 28, 1900.
J. G. EMERY, Jr.
WEIGHING TRUCK.
(Application filed Feb. 1, 1898.)

(No Model.) 2 Sheets—Sheet 1.

Witnesses Inventor:
John G. Emery, Jr.,
by Dodge and Sons,
Attorneys

No. 656,717. Patented Aug. 28, 1900.
J. G. EMERY, Jr.
WEIGHING TRUCK.
(Application filed Feb. 1, 1898.)
(No Model.) 2 Sheets—Sheet 2.
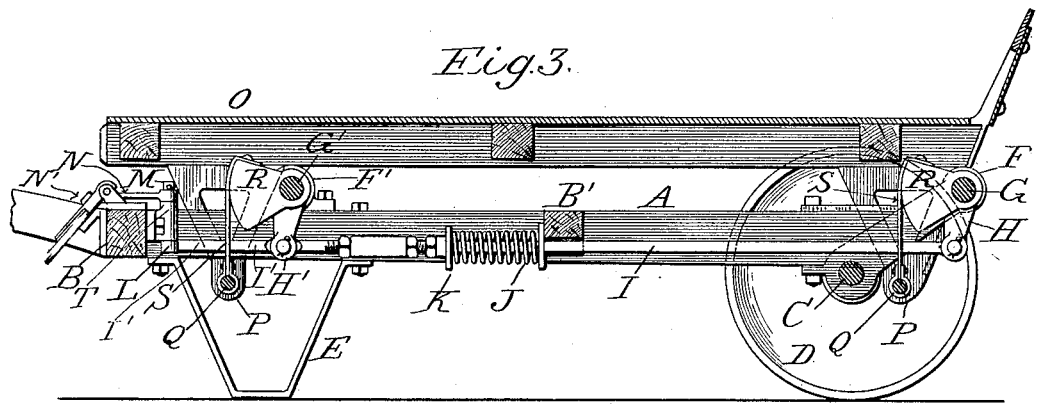
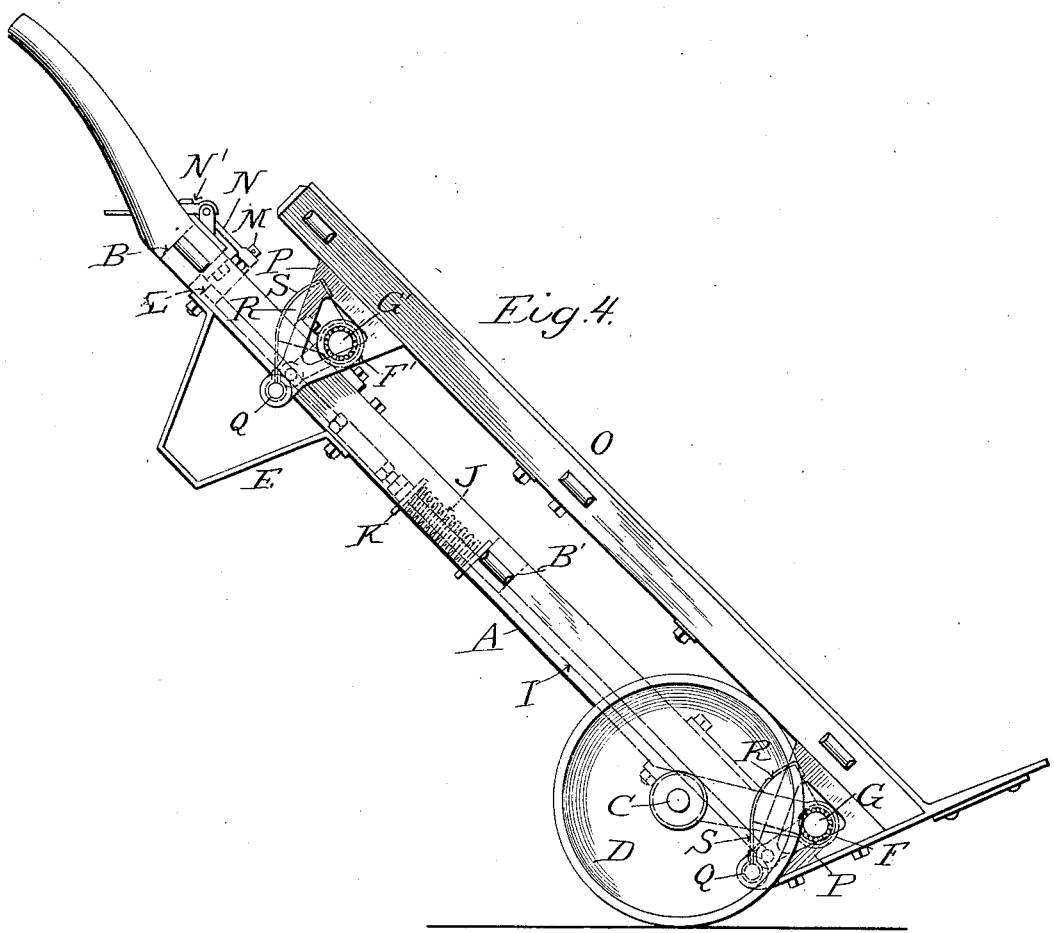

UNITED STATES PATENT OFFICE.

JOHN G. EMERY, JR., OF MUSKEGON, MICHIGAN.

WEIGHING-TRUCK.

SPECIFICATION forming part of Letters Patent No. 656,717, dated August 28, 1900.

Application filed February 1, 1898. Serial No. 668,755. (No model.)

*To all whom it may concern:*

Be it known that I, JOHN G. EMERY, Jr., a citizen of the United States, residing at Muskegon, in the county of Muskegon and State of Michigan, have invented certain new and useful Improvements in Weighing-Trucks, of which the following is a specification.

My invention relates to that class of hand-trucks known as "weighing-trucks" because of their being provided with weighing mechanism to determine and indicate the weight of the load carried upon the platform.

The invention consists in a novel construction and arrangement of parts whereby the weighing mechanism is adapted to operate freely and accurately whether the truck and its platform be in a horizontal position or the handles be raised so as to incline the frame and platform more or less, as happens in use.

The various novel features, combinations, and details involved in my invention will be duly pointed out in the following description and set forth in the claims.

Figure 1:
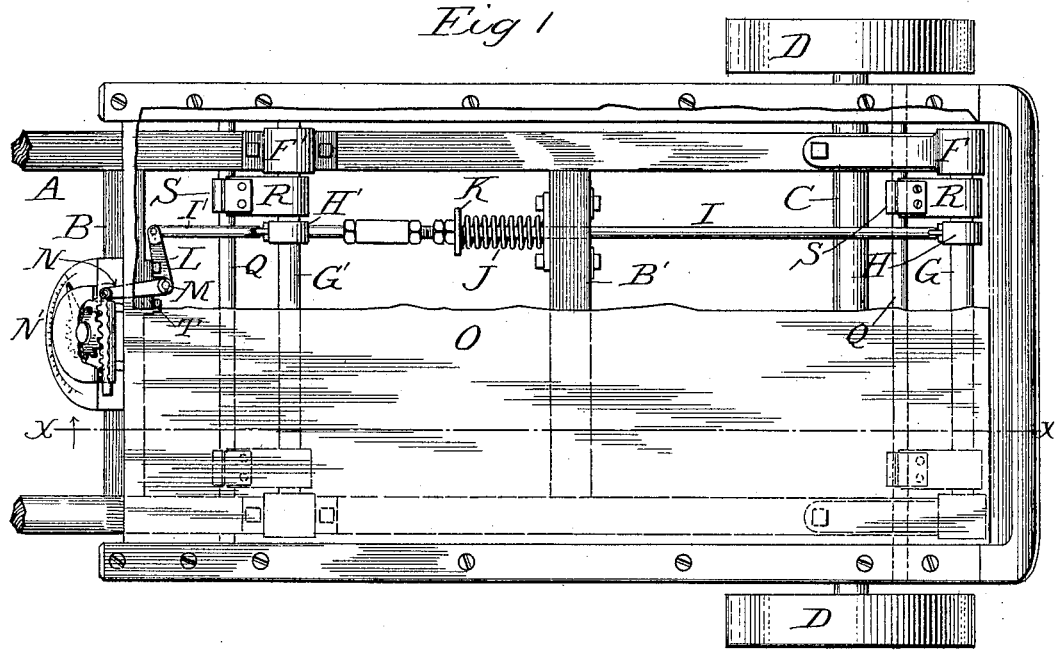
Figure 2:
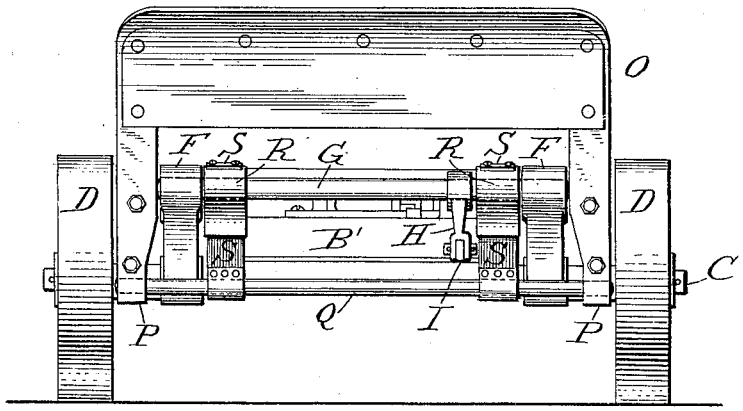

Figure 1 of the accompanying drawings is a top plan view of my improved truck with the platform partially broken away to show the mechanism beneath and the handles broken off to bring the figure within the space available; Fig. 2, a front end elevation of the truck; Fig. 3, a vertical longitudinal section on the line *x x* of Fig. 1, and Fig. 4 a side elevation of the truck with the handles raised so as to incline the truck at an angle of approximately forty-five degrees to the horizon.

The main frame of the truck is of substantially the usual construction—that is to say, it comprises two main side bars or rails A A, the rear ends of which are fashioned into handles, said rails being connected by cross-bars B and B' and provided with boxes in which is carried an axle C, provided with bearing-wheels D. Feet or supports E are applied to the side rails just in advance of the cross-brace B or at other convenient points.

F F indicate two castings or forgings which may be conveniently made in the form indicated in the drawings to constitute bearings or boxes both for the axle C and for a shaft G, which extends transversely across the front of the truck-frame, as shown in the several figures. Toward the rear end of the truck-frame I locate a second pair of boxes or bearings F', in which is journaled a shaft G', parallel and in plane with shaft G, both of said shafts being advisably carried in roller-bearings or like antifriction-supports in order that they may move freely and respond readily to slight force tending to turn them.

Keyed or otherwise rigidly secured to the shaft G is a radial arm H, and likewise secured to shaft G' is a similar arm H', said arms being of equal radius and having their outer ends connected by a rod I, which is advisably made in two sections threaded, respectively, right and left and connected by a sleeve or turnbuckle, whereby the length of the rod may be increased or diminished at will, suitable jam-nuts being provided to prevent the sleeve from turning accidentally. This provision is not essential, but is found convenient in practice.

J indicates a strong spiral spring, one end of which rests against a plate or washer supported by the cross bar or brace B' and the other end of which bears against a disk or collar K, carried by the rod I and capable of adjustment thereon to vary the compression of the spring J. A convenient means of adjustment is afforded by threading the rod and tapping the hub of the disk or washer K to fit the thread, a jam-nut or other means being provided to prevent the accidental turning of the disk or collar.

I' indicates a link-pin jointed or otherwise flexibly connected at one end with the rod I or with arm H' and at the other end with an arm L, projecting radially from a vertical shaft or spindle M, which also carries a second arm N, said arms being rigidly affixed to the shaft or spindle, so as to maintain a fixed relation each to the other. The shaft or spindle M is carried in a bracket or casting T, bolted or otherwise secured to the cross bar or brace B or other part of the main frame of the truck. The arm N is connected with any suitable indicating device, the pointer or hand of which moves over a graduated dial N', which may conveniently be formed with or attached to the bracket or casting T. In the drawings the arm N is shown connected with a rod or bar which slides longitudinally through a guide over the dial-plate, said rod or bar being suitably connected with the pointer, as by intermeshing teeth, as indicated in Fig. 1, by a pin-and-slot connection or in any equivalent well-known manner. No claim is made by me to the specific construction of the dial and pointer, nor do I restrict myself to any particular form thereof.

The shafts G and G' carry each a pair of sector-shaped levers or castings R, which are set near the respective boxes or bearings of the shafts, as indicated in Figs. 1 and 2, all of said levers or castings having the same radius.

O indicates the weighing-platform of the truck, which is provided with the usual scoop or front plate to pass beneath the boxes, barrels, or other articles and to support the same when the truck is carried in an inclined position. Secured to the frame of the platform O and extending downward therefrom are four brackets or castings P, located at or near its four corners. The brackets or castings are connected in pairs by transverse rods Q, and the platform is supported and carried by flexible bands, straps, or connections S, extending from the upper angles of the sectors R to the rods Q, as best shown in Fig. 3. The shafts G and G' being connected through the radial arms H H' and rod I, and being therefore compelled to move in unison, it will be apparent that the sectors R must likewise move synchronously and equally. Hence the platform sustained by the four sectors through the connecting straps or bands S must fall and rise equally at all points and maintain its parallelism with the main frame. If, therefore, an object be placed upon any portion of the platform, said platform will descend squarely and evenly to the extent due to the weight of such article. In descending, the platform, acting through the straps or bands S, will cause a descent or a downward swinging movement of the sectors R about the axle of the shafts G and G', a longitudinal movement of the rod I, and a consequent compression of the spring J between the fixed bearing-plate or the cross-bar B and the movable collar or disk K, such movement and compression being of course proportionate to the weight of the load upon the platform. This movement of the parts of course occasions a corresponding movement of the rod I' and of the arm L, to which it is connected, causing the shaft or spindle M to rock or turn in its support and to swing the arm N about the axis of said shaft, thereby moving the indicator over the graduated dial N' and indicating upon said dial the weight of the load upon the platform.

Owing to the fact that the straps or bands S are connected to the sectors R only at the upper side thereof and that they hang in contact with the peripheries of the sectors only to points in horizontal plane with the axle of the shafts G and G', it follows that the handles of the truck may be raised and lowered to any extent desired or incident in the practical use of such trucks without in any degree varying the leverage with which the load acts upon the shafts G and G', and consequently upon the spring J and the indicator. In other words, the load is at all times suspended by the straps or bands S at a fixed distance from the axle of the shafts G G', this distance being maintained under different loads and different inclinations of the truck through the employment of the flexible bands or straps and the sector-shaped levers or castings R, from which the straps are hung and against the peripheries of which they bear. The straps or bands S may be of any material possessing the requisite strength and flexibility—as, for instance, rawhide, leather, canvas, rope, wires or wire cable, steel, phosphor-bronze, or other metal or alloy or of woven fabric.

Mere reversal of the parts—that is to say, placing those which are carried by the platform in the main frame and placing those which are in the main frame in the platform—would not of course affect the principle or the operation of the mechanism set forth.

It is obvious that the peripheral extent of the sectors may be greater or less, as desired, or that instead of being made in the form of sectors the levers or castings R may be complete circles; but as no advantage is derived through the extension of the peripheral faces beyond the circumferential measurement necessary to afford a bearing for the straps under all the varying adjustments or positions which the truck takes in use it is not deemed desirable to thus add to the weight of said levers.

Having thus described my invention, what I claim is—

1. In combination with a hand-truck provided at one end with wheels and at the other end with handles, a weighing-lever system mounted in the frame of said truck; flexible suspending straps or bands hung from the weighing-levers; and a platform having depending arms directly connected with the free ends of the suspending bands or straps, substantially as shown and described, whereby the platform is enabled to rise and fall freely when in any position from horizontal to an inclination of approximately forty-five degrees.

2. In combination with a hand-truck frame provided at one end with handles and at the other end with wheels and adapted to be moved to varying inclinations or angles; weighing mechanism carried thereby and provided with sector-shaped levers; flexible straps or bands carried by said levers and bearing upon the peripheral faces thereof; and a platform carried by the free ends of said bands, and free to rise and fall regardless of the inclination of the frame.

3. In a truck, the combination of a frame; a platform; a spring; shafts interposed between the truck and the platform and provided with sector-shaped levers; connections between the shafts and the spring; and flexible bands or straps connecting the platform and the sectors and arranged to bear upon the peripheral faces of the latter, substantially as described.

4. In combination with a supporting-frame, shafts provided with sector-shaped levers, and connected to move in unison; a spring or counterbalance tending to resist rotation of said shafts; a platform; and flexible load-carrying bands or straps secured to the sector-shaped levers, and arranged to bear upon the peripheral faces thereof, substantially as described.

5. In combination with a hand-truck frame; shafts G, G' journaled therein; arms H, H' secured to said shafts; rod I connecting said arms; a spring J tending to resist rotation of the shafts in one direction; levers R having peripheral faces concentric with the shafts G G'; a platform O; rods or supports Q carried by said platform; flexible bands or straps S connecting the rods and the levers R; and an indicating device connected with one of the moving parts above recited, substantially as and for the purpose described.

In witness whereof I hereunto set my hand in the presence of two witnesses.

JOHN G. EMERY, Jr.

Witnesses:
HARRY SAWYER,
OTTO ALBERT.